United States Patent
Granneman

(10) Patent No.: US 11,462,246 B2
(45) Date of Patent: *Oct. 4, 2022

(54) APPARATUS AND METHODS FOR IMPROVING VIDEO QUALITY FROM A DIGITAL VIDEO SIGNAL INCLUDING REPLICATED IMAGE FRAMES

(71) Applicant: KARL STORZ Imaging, Inc., Goleta, CA (US)

(72) Inventor: Russell Granneman, Goleta, CA (US)

(73) Assignee: KARL STORZ Imaging, Inc., Goleta, CA (US)

( * ) Notice: Subject to any disclaimer, the term of this patent is extended or adjusted under 35 U.S.C. 154(b) by 72 days.

This patent is subject to a terminal disclaimer.

(21) Appl. No.: 16/904,382

(22) Filed: Jun. 17, 2020

(65) Prior Publication Data
US 2020/0321027 A1 Oct. 8, 2020

Related U.S. Application Data

(63) Continuation of application No. 16/250,155, filed on Jan. 17, 2019, now Pat. No. 10,692,535, which is a
(Continued)

(51) Int. Cl.
| | |
|---|---|
| *G06V 10/00* | (2022.01) |
| *G11B 27/031* | (2006.01) |
| *H04N 21/231* | (2011.01) |
| *H04N 19/172* | (2014.01) |
| *H04N 19/182* | (2014.01) |

(Continued)

(52) U.S. Cl.
CPC ........ *G11B 27/031* (2013.01); *H04N 13/139* (2018.05); *H04N 19/132* (2014.11); *H04N 19/154* (2014.11); *H04N 19/172* (2014.11); *H04N 19/182* (2014.11); *H04N 21/23116* (2013.01)

(58) Field of Classification Search
CPC .. H04N 19/132; H04N 19/154; H04N 19/172; H04N 19/182; H04N 7/12; H04N 7/01; H04N 5/08; H04N 5/10; H04N 9/78; H04N 9/77; H04N 21/23116; H04J 3/06; H04J 3/24; G09G 5/00; H03L 7/00
See application file for complete search history.

(56) References Cited

U.S. PATENT DOCUMENTS

| | | | | | |
|---|---|---|---|---|---|
| 4,872,054 | A | * | 10/1989 | Gray | ........... G09G 1/285 348/441 |
| 5,299,073 | A | * | 3/1994 | Dorricott | ........... G11B 15/1875 348/441 |

(Continued)

*Primary Examiner* — Amir Alavi
(74) *Attorney, Agent, or Firm* — Michael Loi

(57) ABSTRACT

A camera control unit for processing a first video signal from an image sensor, the first video signal including a plurality of frames includes a frame replication device that replicates pixels of a respective frame of the first video signal to produce at least one replicated frame, an image processing controller that detects a noise level in the first digital video signal and that selects a modification level for the random modification of the respective pixel data based on the detected noise level, and a frame modification controller that modifies at least some of the respective pixels in the at least one replicated frame resulting in at least one modified replicated frame based on the selected modification level.

20 Claims, 3 Drawing Sheets

Related U.S. Application Data continuation of application No. 15/647,647, filed on Jul. 12, 2017, now Pat. No. 10,224,074.

(51) Int. Cl.
  *H04N 13/139* (2018.01)
  *H04N 19/154* (2014.01)
  *H04N 19/132* (2014.01)

(56) References Cited

U.S. PATENT DOCUMENTS

| | | | | |
|---|---|---|---|---|
| 5,621,470 | A * | 4/1997 | Sid-Ahmed | H04N 7/0102 348/448 |
| 5,724,475 | A * | 3/1998 | Kirsten | G08B 13/19645 348/E7.086 |
| 6,011,901 | A * | 1/2000 | Kirsten | G08B 13/19645 348/E7.086 |
| 6,014,491 | A * | 1/2000 | Hair | G11B 27/031 386/278 |
| 7,143,432 | B1 * | 11/2006 | Brooks | H04N 21/234363 725/105 |
| 7,317,759 | B1 * | 1/2008 | Turaga | H04N 19/147 375/240.01 |
| 8,223,848 | B2 * | 7/2012 | Rodriguez | H04N 19/44 375/240.25 |
| 8,295,681 | B2 * | 10/2012 | Hair | H04N 5/765 386/263 |
| 9,338,420 | B2 * | 5/2016 | Xiang | G10L 19/008 |
| 10,692,535 | B2 * | 6/2020 | Granneman | H04N 21/23116 |
| 2008/0198264 | A1 * | 8/2008 | Balram | H04N 7/163 348/E7.003 |

* cited by examiner

APPARATUS AND METHODS FOR IMPROVING VIDEO QUALITY FROM A DIGITAL VIDEO SIGNAL INCLUDING REPLICATED IMAGE FRAMES

CROSS-REFERENCE TO RELATED APPLICATIONS

This application is a continuation of and claims priority to U.S. App. Ser. No. 16/250,155 filed on Jan. 17, 2019 and entitled, "Apparatus and Methods for Improving Video Quality from a Digital Video Signal Including Replicated Image Frames," which is a continuation of and claims priority to U.S. App. Ser. No. 15/647,647 filed on Jul. 12, 2017 and entitled, "Apparatus and Methods for Improving Video Quality from a Digital Video Signal Including Replicated Image Frames."

TECHNICAL FIELD OF THE INVENTION

The invention relates to digital video signal processing systems and particularly to such systems which receive a video signal stream at a first frame rate and then replicate image frames from that video signal stream to produce a video signal stream at a higher frame rate. The invention encompasses methods for video signal processing, apparatus for video signal processing, and video systems.

BACKGROUND OF THE INVENTION

Digital video systems generally include image capturing components which create a digital video signal for a desired scene and signal processing components which perform various format conversions or other processing tasks to ultimately produce an input to a digital video display monitor which displays a video image of the desired scene.

Digital video signals are typically made up of a stream of data defining a series of image frames which may by displayed at a video monitor rapidly in succession at a desired frame rate to produce a video image. Each image frame (hereinafter referred to simply as a "frame") is made up of a number of pixels with each pixel defining the light intensity at a particular point in the frame. Each pixel in a frame is defined by pixel data which specifies the light intensity in terms of a digital value or set of digital values in the case of color video. For example, each pixel in a digital video frame may be represented by three 8-bit values each defining a respective color component for the pixel, such as red, green, and blue. In addition to the color component data, the pixel data may include additional data defining other characteristics of the point in the frame such as transparency for example.

In some cases, the digital video signal generated by the image capturing components of a digital video system may be at a lower frame rate than the frame rate at which the video display monitor operates. For example, a medical video imaging system may employ a light sensor array that detects light over a relatively long period of time (that is, a long integration period) to generate a respective frame and thus may create frames at a slower frame rate than the frame rate at which frames are to be displayed by the system display monitor. Such a situation may occur with cameras operating in fluorescence imaging modes where the image capture system is light starved and therefore forced to employ a long integration period for each frame.

Frame replication is a common solution to address the situation in which a given digital video signal at a first frame rate must be used to drive a video display monitor at a higher frame rate. Frame replication may be accomplished by buffering the frames of the lower frame rate video signal in buffer memory so that the frames may be read at a higher rate to produce the desired higher frame rate signal. In this solution, each frame of the lower frame rate video signal is replicated as many times as necessary to produce a video signal at the desired higher frame rate. Take, for example, the case where a given set of image capturing components generate a digital video signal at 15 frames per second ("fps") while the video signal is to be displayed on a display monitor which operates at an update/refresh rate of 60 fps. In this case, each frame of the lower frame rate digital video signal may be buffered in suitable buffer memory, having a suitable buffer memory architecture such as a classical triple buffer architecture for example, and read four times from that memory to produce a digital video signal having the desired 60 fps rate. That is, each frame of the lower frame rate digital video signal is replicated four times and each replicated frame is placed in an output digital video signal having the higher frame rate. In this frame replicating technique, the digital video signal ultimately sent to the display monitor causes the display monitor to show the exact same frame (exact down to each respective pixel in the frame) four times before the next frame from the lower frame rate digital video signal can be displayed on the display monitor.

SUMMARY OF THE INVENTION

A problem with the above-described prior art frame replication technique is that it accentuates noise perception in the lower frame rate video signal. That is, even though the display monitor is being refreshed at a sufficiently high rate so that noise present in individual frames might not be perceived by an observer, the observer sees any noise present in frames of the original, lower frame rate digital video signal over a longer period of time (four times in the above example of 15 fps capture and 60 fps display). Thus, the frame replication used to produce a higher frame rate digital video signal from a lower frame rate signal may result in a lower quality video image than would otherwise be possible at the higher update rate at which the display monitor is capable of operating.

It is an object of the invention to provide processing methods and processing apparatus which may increase the quality of video in video systems employing frame replication to increase frame rate.

A medical imaging apparatus for processing a frame of a digital video signal includes an image sensor assembly, a frame replication device, a frame modification controller, and a video encoder. The image sensor assembly generates a first video signal having a first frame rate. The frame replication device replicates pixels of a respective frame of the first video signal to produce at least one replicated frame. The frame modification controller randomly modifies at least some of the respective pixels in the at least one replicated frame resulting in at least one modified replicated frame. The video encoder outputs a second video signal based on the at least one modified replicated frame.

In other features, the second video signal includes a higher frame rate than the first video signal. In yet other features, the second video signal comprises a combination of frames including the respective frame of the first video signal, the at least one replicated frame, and the at least one modified replicated frame. In still other features, the second video signal comprises a combination of frames including at least one replicated frame and at least one modified replicated frame. In other features, the second video signal comprises a plurality of modified replicated frames.

In yet other features, the medical imaging apparatus includes an image processing controller that detects a noise level in the first digital video signal and that selects a modification level for the random modification of the respective pixel data based on the detected noise level. The frame modification controller modifies the respective pixel data according to the selected modification level.

In still other features, the medical imaging apparatus includes an image processing controller that detects a noise level specific to a first color component of the first digital video signal and that selects a first color component modification level for the random modification of the respective pixel data based on the detected noise level. The frame modification controller modifies a first color component of the respective pixel data according to the selected first color component modification level and modifies color components of the respective pixel data other than the first color component according to a second modification level different from the first color component modification level.

In other features, the frame modification controller modifies the pixel data for each pixel in the respective replicated frame. In yet other features, the frame modification controller modifies the pixel data for every nth pixel in a respective line of pixels for the replicated frame where n is an integer greater than 1. In still other features, the frame modification controller randomly selects a subset of pixels in the at least one of the replicated frames and wherein the random modification of the respective pixel data is performed for the randomly selected subset of pixels.

In yet other features, the medical imaging apparatus includes an image processing controller that detects a noise level in a sub-area of the frames making up the first digital video signal and selects a modification level for the random modification of the respective pixel data based on the detected noise level. The frame modification controller applies the selected modification level to modify the respective pixel data of pixels in a sub-area of the replicated frame corresponding to the sub-area of the frames making up the first digital video signal.

It should be noted that the term "random" as used in this disclosure and the accompanying claims encompasses both true randomness and pseudo-randomness. That is, a random modification according to the present disclosure and claims may comprise a true random modification or any pseudo-random modification.

As noted above in the background section, noise included in the original, lower frame rate digital video signal, and necessarily replicated in the replicated frames, may be perceptible to the viewer of the higher frame rate digital video signal. However, methods according to this first aspect of the invention have the advantage that the random modifications to the pixel data defining the various replicated frames included in the second digital video signal tend to mask noise included in the original, lower frame rate digital video signal. Thus, the second, higher frame rate digital video signal may produce a video display that is more pleasing to the viewer.

The modification of pixel data according to this first aspect of the invention is independent of quantization of the pixel data. Thus, the random modification of pixel data according to the present invention is not a randomization of quantization errors commonly referred to as "dithering." The random modification of pixel data for various frames included in a digital video signal according to aspects of the present invention may be applied in addition to any dithering applied to a digital video signal.

According to another aspect of the present invention, an apparatus includes a video frame replication device configured to receive a first digital video signal having a first frame rate, and to replicate a respective frame of the first digital signal multiple times to produce a series of replicated frames. The series of replicated frames produced by this replication device are included in a second digital video signal having a second frame rate greater than the first frame rate. The apparatus further includes a frame modification controller configured to randomly modify the respective pixel data for at least some of the pixels of at least one of the replicated frames. This random modification of pixel data for pixels in a respective replicated frame results in a modified replicated frame which is included in the second digital video signal to provide the noise masking advantage noted above as to the previously described aspect of the invention.

Another aspect of the present invention comprises a video system which includes a video frame replication device and frame modification controller similarly to the apparatus described above, and further includes an image sensor assembly and camera control module. The image sensor assembly in this additional aspect of the invention generates the first, lower frame rate digital video signal for processing by the camera control module. The video frame replication device and frame modification controller are included in the camera control module according to this aspect of the invention.

Implementations according to any of the above aspects of the invention may include a dynamic aspect to the modification of the replicated frames based on one or more characteristics of the first digital video signal. For example, an implementation may detect a noise level in the first digital video signal and may select a modification level for the random modification based on this detected noise level. The random modification of pixel data may then be performed based on the selected modification level, that is, based on one or more parameters of the selected modification level as will be described further below. In some implementations, the noise level detection may be specific to a particular color component of the first digital video signal. In these implementations, the random modification of pixel data may be performed based on the selected modification level as to the particular color component, but at different levels for the other color components. The noise detection may also be for only one or more sub-areas of a frame or frames making up the first digital video signal (that is, not the entire area defined by the respective frame), and the modification may only be applied based on the detected noise level to pixel data for pixels in corresponding sub-areas of the replicated frames. Alternatively, the noise detection in one or more sub-areas of a frame or frames of the first digital video signal may be applied to set the level of modification applied to pixel data for pixels over the entire area of a replicated frame.

Some implementations according to the various aspects of the invention may include dynamic modification of replicated frames which is not based on any characteristic of the first digital video signal. For example, an implementation according to any of the above aspects of the invention may apply the pixel data modification from one replicated frame to the next based on some pattern, such as every nth replicated frame where n is an integer greater than one and may or may not be a static value. Regardless of whether a dynamic modification of pixel data is based on some characteristic of the first digital video signal or not, these implementations may include a determination for each given replicated frame whether the frame is to be modified or left unmodified.

Embodiments of the present invention may include many variations in the manner in which the pixel data is modified. In some cases, the pixel data for each pixel in a given frame is randomly modified. In other cases, the pixel data for only some of the pixels in a given frame may be modified. The determination of whether pixel data for a given pixel is modified or not may be random or according to some pattern. In the latter case, every other pixel or every nth pixel in a frame (where n is an integer greater than 1) may have the corresponding data modified. Furthermore, a determination as to the particular modification to be applied to the pixel data for a given pixel may be random, based on one or more characteristics of the first digital video signal, or based on some predetermined pattern.

These and other advantages and features of the invention will be apparent from the following description of illustrative embodiments, considered along with the accompanying drawings.

DESCRIPTION OF REPRESENTATIVE EMBODIMENTS

In the following description, FIG. 1 will first be used to describe a digital video system and apparatus according to aspects of the present invention. Methods according to additional aspects of the invention will then be described with reference to FIGS. 2 and 3 generally and in the context of the system shown for example in FIG. 1.

The present invention may be implemented in any digital video system in which frames from a first, relatively lower frame rate digital video signal are replicated and placed in a second digital video signal having a relatively higher frame rate. Thus, the present invention may have application in endoscopic systems, laparoscopic systems, digital microscopes, digital cameras, and mobile phones equipped with imaging sub-systems, for example. While aspects of the invention may be described in terms of the video system shown in FIG. 1, which has a configuration commonly found in endoscopes and laparoscopes, it should be appreciated that the invention is by no means limited to this example configuration.

Figure 1:
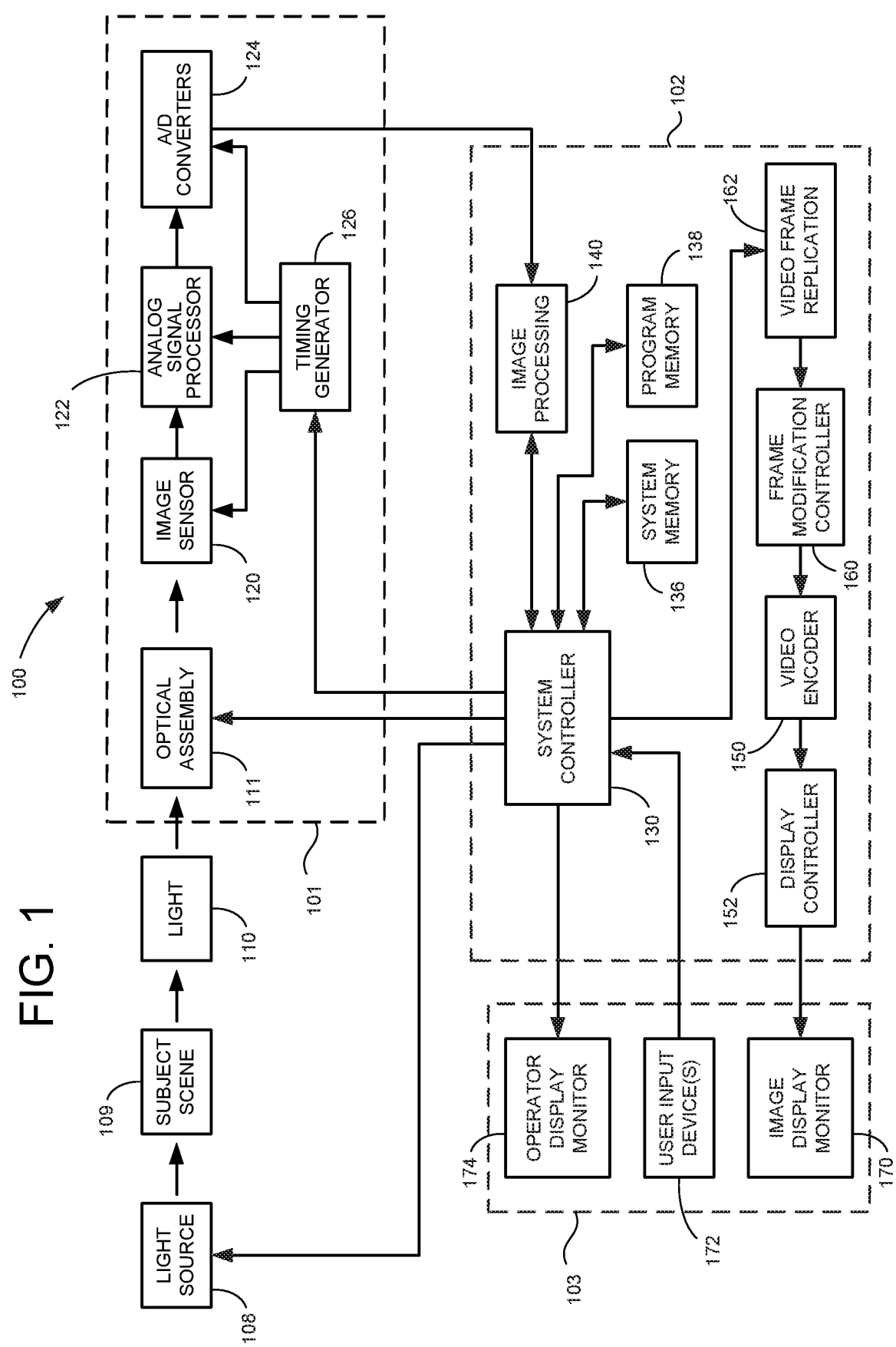
FIG. 1 is a functional block diagram of a digital video system embodying aspects of the present invention.

The digital video system 100 illustrated in FIG. 1 includes three subsystems, an image sensor assembly is shown as dashed box 101, a camera control unit shown as dashed box 102, and a user interface shown as dashed box 103. In this example embodiment, image sensor assembly 101 includes elements for sensing an image and producing a digital video signal from the sensor output. Camera control unit 102 includes elements for processing the digital video signal received from image sensor assembly 101, and for placing the signal in a form which may be used to drive an image display monitor included in user interface 103. This functionality includes frame replication for the digital video signal received from image sensor assembly 101 and frame modification according to the present invention as will be described in detail below. The illustrated camera control unit 102 also generates control signals for both image sensor assembly 101 and associated elements and receives control inputs from elements of user interface 103. User interface 103 in this example video system includes elements for displaying images generated from the digital video signal output from camera control unit 102, for providing an operator display, and for receiving user inputs which may be used to operate and control the video system.

A light source 108 directs light to illuminate a subject scene shown in FIG. 1 at reference number 109 so that image sensor assembly 101 may produce a useable digital video image of the subject scene. In particular, light source 108 illuminates subject scene 109 with visible light and/or fluorescent excitation light which may be outside the visible spectrum in the ultra-violet range or the infra-red/near infrared range, or both. Light source 108 may include a single light emitting element configured to provide light throughout the desired spectrum, or multiple light emitting elements for producing the desired light for illuminating subject scene 109. In some implementations, light source 108 may include light emitting devices such as LEDs which are placed proximate to subject scene 109, while in other implementations light emitting devices may be placed remotely and the emitted light may be directed to the subject scene through a suitable light guide such as one or more optical fibers. For example, in medical endoscopic applications, both light source 108 and image sensor assembly 101 may be included in an endoscope connected to camera control unit 102. In these implementations, light source 108 may be located at the tip of the endoscope shaft or may be located in a body or camera head for the endoscope. In the former case light source 108 directly illuminates a subject scene proximate to the endoscope tip, while in the latter case light from the light source is directed to the subject scene at the endoscope tip through a light guide arrangement extending through the endoscope shaft. Regardless of the nature of light source 108, the emitted light results in light 110 from subject scene 109 which is collected and focused by one or more lenses included in an optical assembly 111 to form an image at image sensor 120 included in image sensor assembly 101. It will be appreciated that light 110 may be light from light source 108 which is reflected from the subject scene 109 or, as in the case of fluorescence imaging, may be light emitted from the subject scene in response to excitation light incident on the subject scene from the light source.

The example embodiment of FIG. 1 is illustrated as including a single image sensor as part of image sensor assembly 101. It will be appreciated, however, that a given sensor 120 may comprise an array of discrete image sensing elements such as separate R, G, and B sensor arrays. Also, video systems according to the present invention may include multiple types of sensors rather than a single sensor type. For example, an image sensor assembly within the scope of the present invention may include multiple different types of sensor elements each operable to sense light in a different spectrum. In any case, sensor 120 or other light sensors included in a video system embodying principles of the present invention may be active pixel complementary metal oxide semiconductor sensor devices (CMOS APS), charge-coupled devices (CCD), or any other digital imaging sensor devices now known or developed in the future. Regardless of the particular type or configuration of image sensor 120, the element converts the incident within its operating spectrum to an electrical signal by integrating charge for each pixel defining a point in the image.

The total amount of light 110 reaching the image sensor 120 may be regulated by the intensity of light emitted from light source 108 and an aperture (not shown separately) associated with optical assembly 111. Control of light source 108 and optical assembly 111 may be provided by control signals from camera control unit 102 as indicated by the signal paths shown in FIG. 1 from the camera control unit to the light source and optical assembly. Camera control unit 102 may also directly or indirectly control the time over which image sensor 120 integrates charge to capture a frame of subject scene 109 to be included in the desired video signal. The random modification of frames according to the present invention has particular application in situations in which the charge integration period for each frame is relatively long and thus frames may be produced at a relatively low rate, at least lower than the frame rate at which the desired image may ultimately be displayed in the video system. These long charge integration and low image frame rate situations are examples of situations in which frame replication may be employed as will be described further below, and in which random modification of replicated frames according to the present invention may be desirable.

The analog signals produced by image sensor 120 are processed by analog signal processor 122 in the example implementation of FIG. 1, and then digitized at analog-to-digital (A/D) converter 124 to produce a stream of frame data containing the various color channels employed in the case or color video. Timing generator 126 produces various clocking signals to select rows and pixels and synchronizes the operation of image sensor 120, analog signal processor 122, and A/D converter 124 to produce the desired stream of frame data. This stream of frame data output from A/D converter 124 may represent a first digital video signal in the context of the present invention and is directed to camera control unit 102 for further processing.

The example camera control unit 102 shown in FIG. 1 includes a system controller 130 along with system memory 136 and program memory 138. The example camera control unit 102 also includes image processing controller 140, a video encoder 150, and a display controller 152. This particular implementation further includes a frame modification controller 160, and a video frame replication device 162 interposed between system controller 130 and video encoder 150. Video frame replication device 162 in this illustrated embodiment may comprise a buffer arrangement that replicates frames from the first digital video signal received from image sensor assembly 101 as necessary to produce a digital video signal having the desired frame rate, while frame modification controller 160 randomly modifies replicated frames according to aspects of the present invention as will be discussed in further detail in connection with the process flow diagrams of FIGS. 2 and 3.

The system controller 130 controls the overall operation of the video system 100 based on a software program stored in program memory 138. This memory can also be used to store user setting selections and other data to be preserved when the system is turned off. In particular, system controller 130 controls the data capture which results in the first digital video signal by setting light source 108 intensity, the optical assembly 111 aperture, and any filters included in optical assembly 111, and by controlling the timing that may be necessary to obtain the image stream based on the sensed light.

Image processing controller 140 may function to provide any number of image processing tasks in video system 100. In implementations in which the modification of frames according to the present invention is dependent upon a detected noise level in the first digital video signal, the noise detection may be performed by image processing controller 140. In these implementations image processing controller 140 may also be configured to select a modification level to be applied by frame modification controller 160. Where included in the system, the noise detection may be performed in any suitable fashion. Image processing controller 140 may also perform operations on the incoming digital video signal for purposes other than in connection with frame modification according to the present invention. For example, when video system 100 comprises a medical endoscopic system, image processing controller may modify the data of the incoming digital video signal to accentuate aspects of the video signal data to enhance the diagnostic value of the images.

Image data including a stream of frames that have been processed according to image processing controller 140, replicated to provide a desired frame rate by video frame replication device 162, and modified according to the present invention by frame modification controller 160 are continuously sent to video encoder 150. As is well known in the art, video encoder 150 places the incoming image data in a desired compressed format for display controller 152. Display controller 152 then generates the desired video signal (HDMI or DVI, for example) which provides an input to image display monitor 170 of user interface 103. Image display monitor 170 functions to display video images according to the input signal from camera module 102 and may comprise any suitable display device such as a liquid crystal display backlit with light-emitting diodes (LED LCD), for example.

In addition to image display monitor 170, user interface 103 in the example video system shown in FIG. 1 includes a user input arrangement 172 and an operator display 174. User input arrangement 172 may include a keyboard, computer pointing devices, buttons, rocker switches, joysticks, rotary dials, or touch screens (implemented on operator display 174 or some other display of the user interface 103). Operator display 174 may include any suitable arrangement for providing system status or operation information to an operator of the system, and preferably includes a display device such as an LED LCD display through which status and operating information may be displayed to the system operator. Both user input arrangement 172 and operator display 174 communicate with system controller 130 over suitable communication links. For example, devices included in user input arrangement 172 may communicate with system controller 130 over a suitable serial communication connection such as USB or RS-232. Operator display 174 may communicate with system controller over a suitable video cable.

The functional block diagram of FIG. 1 is provided to illustrate an example video system in which frame replication and frame modification may be implemented according to various aspects of the present invention. Not only may the present invention be employed in any frame replication context, but also numerous variations are possible in a video system such as that shown in FIG. 1. For example, although the functional block diagram of FIG. 1 shows the functional elements of image sensor assembly 101 as discrete elements, these functional elements or various combinations of these elements may be fabricated as a single integrated circuit as is commonly done with CMOS image sensors. Similarly, although the illustrated distribution of functional elements of camera control module 102 among multiple programmable logic devices, processors, and controllers is typical, these programmable logic devices, processors, or controllers can be combinable in various ways without affecting the functional operation of the video system and the application of the invention. These programmable logic devices, processors, or controllers can comprise one or more programmable logic devices, digital signal processor devices, microcontrollers, or other digital logic circuits. Although a combination of such programmable logic devices, processors, or controllers has been described, it should be apparent that one programmable logic device, digital signal processor, microcontroller, or other digital logic circuit may be designated and programed or otherwise configured to perform all of the needed functions described above for camera control module 102. All of these variations can fall within the scope of the present invention.

Methods of processing digital video signal frames may now be described with reference to FIGS. 2 and 3. While the methods shown in FIGS. 2 and 3 will be described in some cases below in the context of the example system shown in FIG. 1, it should be borne in mind that methods according to the invention are certainly not limited to implementation via the system shown in FIG. 1, and, as noted above, may be applied in any digital video system or apparatus that replicates frames from one digital video signal having a first frame rate to produce a second digital video signal having a second, higher frame rate.

Figure 2:
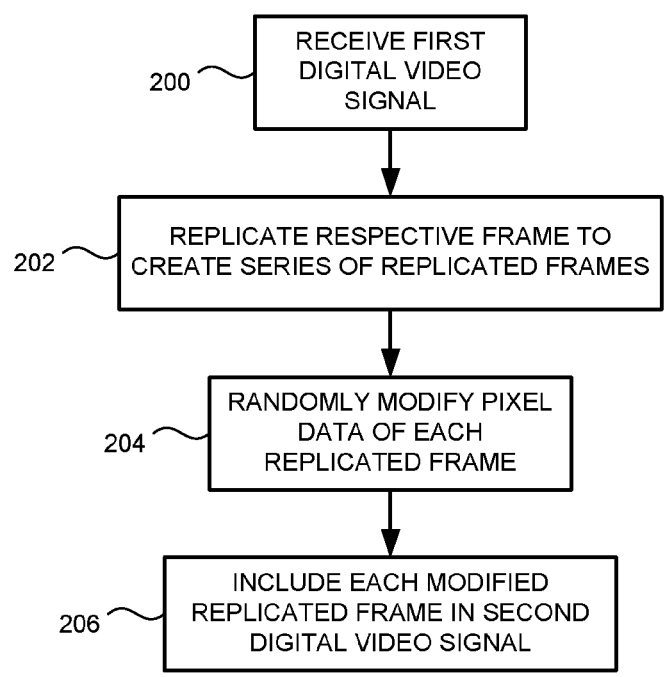
FIG. 2 is a flow diagram showing process steps according to a first embodiment of the present invention.

Referring now to FIG. 2, a process according to one implementation of the present invention includes receiving a first digital video signal as shown at process block 200. The process further includes replicating each frame of the first digital video signal as indicated at process block 202 so as to create a series of replicated frames. As shown at process block 204, the example method of FIG. 1 further includes randomly modifying the pixel data of each replicated frame. Each modified replicated frame is then included in a second digital video signal according to process block 206. In the illustration of FIG. 2, the process steps 202, 204, and 206 may be repeated for each frame of the received first digital video signal to produce the desired second digital video signal.

In the context of the video system shown in FIG. 1, the digital video signal generated by image sensor assembly 101 and communicated to camera control unit 102 may represent the first digital video signal received as shown at process block 200 in FIG. 2. This first digital video signal may be in any format, however, regardless of format the signal defines a stream of frames, each frame represented by an orthogonal bit map of pixels, with each pixel defined by a digital value and representing pixel data for the respective pixel. In a video system such as that shown in FIG. 1, the first digital video signal communicated from sensor assembly 101 to camera control unit 102 may comprise an uncompressed digital video signal. However, it is possible that the first digital video signal in an embodiment of the present invention may be received in some compressed form in which each frame is represented in some compressed form of data. In such a case the signal may be decompressed to facilitate processing, including frame modification according to the present invention. It is also possible that frame modification according to the present invention may be performed on a compressed digital video signal.

The video frame replicating process shown at process block 202 in FIG. 2 may be performed, for example, in any suitable data buffering arrangement such as a triple buffer in which each frame of the first digital video signal is buffered into memory and simultaneously read multiple times to produce the desired series of replicated frames. Regardless of the particular hardware and control employed, the frame replication allows frames of the first digital video signal to be replicated as many times as necessary to produce a stream of frames at a desired frame rate higher than the frame rate of the first digital video signal. This frame replication is performed in the example system of FIG. 1 by video frame replication device 162. Although the functional block diagram of FIG. 1 indicates that the frame replication is performed immediately prior to frame modification, other implementations may include additional processing steps between frame replication as shown at process block 202 in FIG. 2 and frame modification as shown at process block 204. It is also possible that the frame modification shown as a separate block 204 in FIG. 2 is incorporated into the frame replication. In other words, the replication shown at process block 202 may not replicate frames exactly but may instead replicate the frames with random modifications according to process block 204.

As will be described below in connection with FIG. 3, other methods within the scope of the present invention include modifying only selected frames in the stream of replicated frames and leaving some frames unmodified. However, in the example process shown in FIG. 2 the random modification of pixel data is applied to each replicated frame. This pixel data modification shown at process block 204 in FIG. 2 is performed by frame modification controller 160 in the video system shown in FIG. 1. Even in implementations such as that shown in FIG. 2, the modification of pixel data is subject to wide variation within the scope of the present invention. In some implementations, the pixel data for each pixel in the given frame is randomly modified, while in other implementations the pixel data for every other pixel, or more generally ever nth pixel (where n is a constant or varying integer greater than 1) may be randomly modified. Also, the random modification may be applied on a line-by-line basis in the array of pixels making up a given frame, with the same random modification being applied to each pixel in a given line or given number of lines of pixels in the frame. The random modification may comprise a random addition to or subtraction of "1" from each color component value included in the pixel data. Alternatively, the value added to or subtracted from each color component value for a given pixel may be a binary value selected randomly from within a range of values. For example, for each pixel to be modified, a modification may be selected from a set of values 0 through 4 or more. Thus, each color component within the pixel data for a given pixel may be left unchanged or increased or decreased by values of 1, 2, 3, 4, or more. In yet other alternatives for the modification of pixel data shown at process block 204 in FIG. 2, the modification may not be applied to each color component of the pixel data for a given pixel. Rather, only a single or some other subset of the color components may be randomly modified. The number of color components to be modified for a given pixel may also be randomly determined within the scope of the present invention.

Regardless of the particular random modification applied to a given frame as shown at process block 204 in FIG. 2, the modified frame is ultimately included in a stream of frames making up the second digital video signal as shown at process block 206 in FIG. 2. This step of including the given modified frame in the second digital video signal may be performed in any suitable manner within the scope of the present invention. In some embodiments the output of the frame replication device comprising a stream of frames made up of succeeding series of replicated frames may comprise the second digital video signal, and the modification performed as shown at process block 204 in FIG. 2 results essentially in a modified frame included in the second digital video signal. In other implementations, a separate component before or after the component which modifies the frames may assemble the replicated modified frames as desired into a stream of frame data comprising the second digital video signal.

Figure 3:
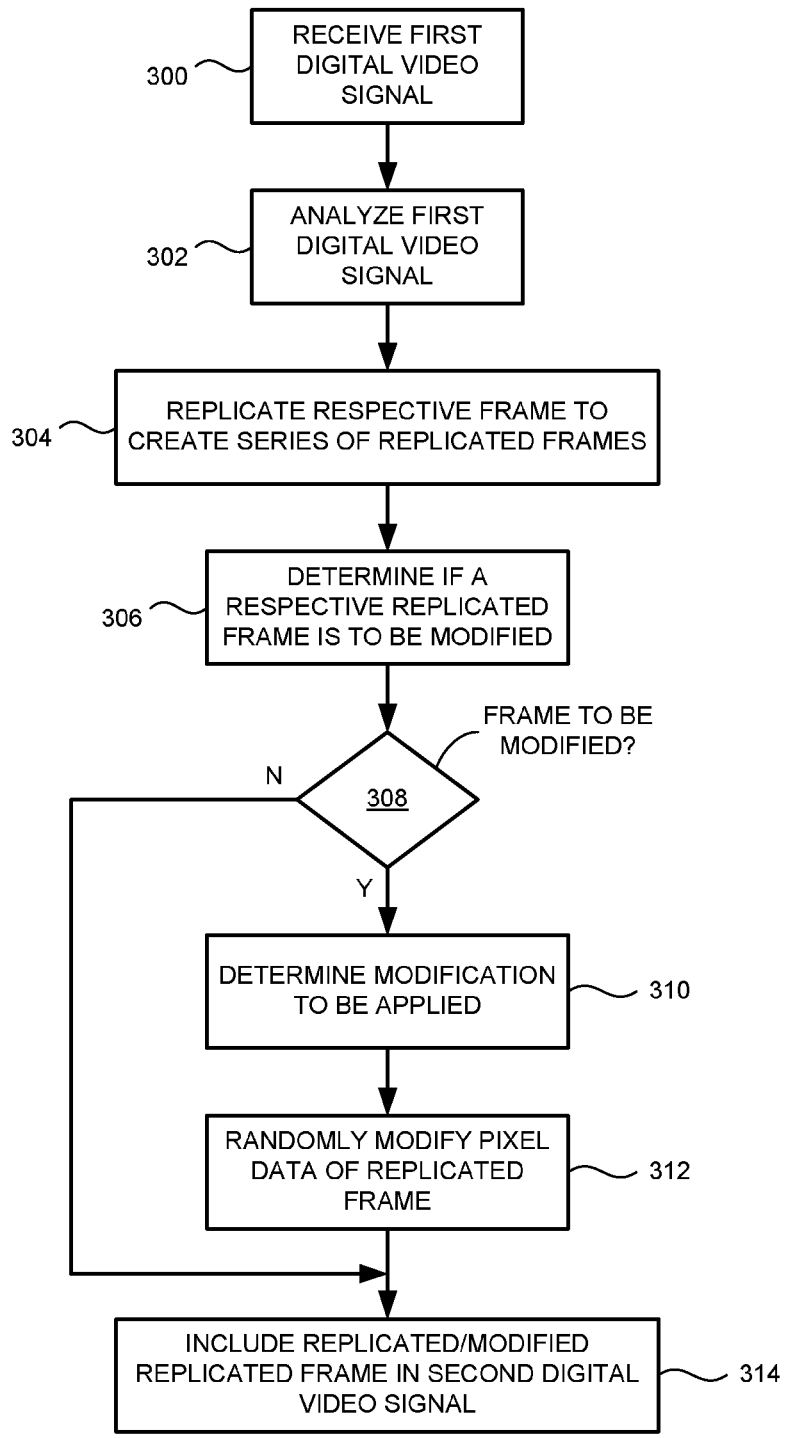
FIG. 3 is a flow diagram showing process steps according to an additional embodiment the present invention.

The process shown in FIG. 3 is similar to that shown in FIG. 2 in that it includes receiving a first digital video signal as shown at process block 300, replicating a respective frame from the first digital video signal as shown at process block 304, modifying pixel data for a replicated frame at process block 312, and including the modified replicated frame in a second digital video signal as shown at process block 314. These for process steps, 300, 304, 312, and 314, may be as described above for the corresponding steps 200, 202, 204, and 206 of FIG. 2. However, the process shown in FIG. 3 includes additional process steps to support dynamic (for example, time varying) modification of replicated frames, including dynamic modification based on characteristics of the first digital video signal and dynamic modification not based on any characteristic of the first digital video signal. In particular, the process shown in FIG. 3 includes analyzing the first digital video signal as shown at process block 302, determining if a given replicated frame in the series of replicated frames is to be modified as shown at process block 306, and depending upon the outcome of the decision indicated at decision box 308, either including the given frame in the second digital video signal unmodified or determining a modification to be applied as shown at process block 310. The steps from process block 304 to 314 may be performed on a frame-by-frame basis and thus repeated for each frame of the incoming first digital video signal and for each replicated frame produced according to process block 304.

The analysis indicated at process block 302 in FIG. 3 may comprise an analysis of one or more frames of the first digital video signal to detect some characteristic of the frame that may be used to affect the frame modification performed at process block 312 in FIG. 3. For example, the analysis at process block 302 may be to determine a noise level in the first digital video signal. Such a noise level may be used at process block 310 in FIG. 3 to determine the modification to be applied to a given frame. In particular, a noise level detected for a frame of the first digital video signal at process block 302 may be used at process block 310 to select a level of modification for frames replicated from that frame or other frames in the first digital video signal. Continuing with this example, the determination at process block 310 may include selecting a random modification of pixel data at the same or similar level as the detected noise level. The noise level detected at the analysis indicated at process block 302 may be a noise level as to all aspects of the frame or a noise level in a single or less than all color components of the frame. In the latter case, the determination at process block 310 may include selecting a random modification level only as to the color component or components included in the detection at process block 302. In any event, the analysis may be limited to a subset of pixels of the given frame to simplify the analysis and the detected characteristic may be used to select a modification level as to just that subset of pixels or the entire set of pixels making up the frame or some other subset of such pixels. Similarly, the analysis at process block 302 may not be conducted for each image frame included in the first digital video signal but for some sample number of frames periodically analyzed for the desired characteristic to be detected.

A noise level detected in accordance with the analysis shown at 302 in FIG. 3 may, for example, indicate a noise level in terms of a number of digital levels in one or more of the digital values included in the pixel data for a given pixel or given set of pixels for a frame. Continuing with this example, a noise level detected at process block 302 may indicate noise at plus or minus 1, 2, 3, 4, or more digital values. In such a case, the modification selected at process block 310 may be a modification or an average modification applied at random of the same digital value detected at block 302. In a specific case, the noise level detected may be at plus or minus 3 digital values and the modification selected at process block 310 may also be at 3 digital values or selected to average plus or minus 3 digital values. Of course there need not be an exact correspondence between a noise level detected at process block 302 and a modification selected at process block 310, although there may be some relationship between the detected noise level and selected modification level such that the modification is based at least partially on the detected noise level.

The analysis indicated at process block 302 may also affect the determination at process block 306 in FIG. 3. For example, a process according to the present invention may include dynamically determining whether frame modification is to be employed for a given frame or frames replicated from the first digital video signal. In one example, where the analysis at 302 in FIG. 3 indicates a noise level in the first digital video signal below some predefined threshold, the determination at process block 306 may be to forego any modification of a given frame as being unnecessary to improve the second, higher frame rate video signal.

The determinations at process blocks 306 and 310 may also include aspects which are not dependent upon any characteristic of the first digital video signal analyzed as indicated at process block 302 in FIG. 3. For example, an implementation of the present invention may be configured to modify every other frame or every nth replicated frame in the series of replicated frames, or in a series of m replicated frames. In these implementations the determination at process block 306 may be a determination as to whether the given frame fits the applicable definition of a frame that is to be modified, i.e., whether the given frame is the nth frame from the last modified frame. In other implementations, the determination made at process block 306 may be a random determination to select a given frame to be modified, particularly a random selection to ensure a certain predefined average number of frames to be modified in a given stream.

At process block 310 in FIG. 3, the determination as to a modification to be applied to a given frame may be based on many factors unrelated to any characteristic of the first digital video signal. For example, the determination at process block 310 may be a random determination or a random determination weighted to ensure an overall proportion of frames are modified over a given number of frames. Continuing with this example, there may be multiple predefined levels of modification to be applied to a given frame, each perhaps defining which pixel data to modify and to what extent. The determination at process block 310 may then be to select one of these predefined levels of modification. Where applied, any of these determinations as to the modification to be applied may be performed at a frame modification controller such as that shown as element 160 in the embodiment of FIG. 1. Alternatively, the random modifications to be performed may be selected by a separate processing device such as that shown at system controller 130 in FIG. 1, and such a separate processing device may control the processing element that actually applies the frame modification. Furthermore, selecting the modification to apply to a given frame in accordance with process block 310 in FIG. 3 need not be done immediately prior to the given modification. Rather, the modification applied at process block 312 in FIG. 3 may be performed according to a script that is generated for a given stream of frames or applied generally to any stream of frames, and thus a predefined script may control the determination indicated at process block 310 in FIG. 3.

Implementations within the scope of the present invention may include numerous variations on the representative process shown for in FIG. 3. For example, the determinations at process block 306 and 310 need not be performed for each replicated frame as suggested by FIG. 3. One implementation along this line may perform the determinations at one or both blocks 306 and 310 only for the first replicated frame of a series of replicated frames, and then the determinations as to that frame may be applied to each replicated frame in the series. Other implementations may omit either one of the determinations shown at process blocks 306 and 310, or may omit the analysis indicated at process block 302 and include one or both of the determinations at process blocks 306 and 310.

It should be noted that frame modification according to the various aspects of the present invention is not limited to any particular frame replication scheme. While the frame replication shown for example at process block 202 in FIGS. 2 and 304 in FIG. 3 may include replicating each frame in the first digital video signal to the same extent, some implementations may apply other frame replication schemes. For example, the frame replication shown at process block 202 in FIG. 2 or process block 304 in FIG. 3 may replicate every other frame of the first digital video signal, or more generally, every xth frame of a series of y frames of the first digital video signal. It is also possible that a frame replication scheme may replicate some frames of the first digital video signal to a first extent, and other frames of the first digital video signal to a second different extent. Replicated frame modification according to aspects of the present invention may be applied to any replicated frame.

Also, although noise level is provided above as an example of a characteristic that may be used to affect a modification applied according to the various aspects of the present invention, the invention is by no means limited to this characteristic. Rather any characteristic or combination of characteristics may be applied. Another example of a characteristic of a frame that may be used to affect the modification to be applied comprises noise type (such as spatial noise, row noise, pixel noise, temporal noise, or combinations of these, for example).

As used herein, whether in the above description or the following claims, the terms "comprising," "including," "carrying," "having," "containing," "involving," and the like are to be understood to be open-ended, that is, to mean including but not limited to. Also, it should be understood that the terms "about," "substantially," and like terms used herein when referring to a dimension or characteristic of a component indicate that the described dimension/characteristic is not a strict boundary or parameter and does not exclude variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Any use of ordinal terms such as "first," "second," "third," etc., in the following claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

The term "each" may be used in the following claims for convenience in describing characteristics or features of multiple elements, and any such use of the term "each" is in the inclusive sense unless specifically stated otherwise. For example, if a claim defines two or more elements as "each" having a characteristic or feature, the use of the term "each" is not intended to exclude from the claim scope a situation having a third one of the elements which does not have the defined characteristic or feature.

The above described preferred embodiments are intended to illustrate the principles of the invention, but not to limit the scope of the invention. Various other embodiments and modifications to these preferred embodiments may be made by those skilled in the art without departing from the scope of the present invention. For example, in some instances, one or more features disclosed in connection with one embodiment can be used alone or in combination with one or more features of one or more other embodiments. More generally, the various features described herein may be used in any working combination.

The invention claimed is:

1. A camera control unit for processing a first video signal from an image sensor, the first video signal including a plurality of frames, comprising:
   a frame replication device that replicates pixels of a respective frame of the first video signal to produce at least one replicated frame;
   an image processing controller that detects a noise level in the first digital video signal and that selects a modification level for the random modification of the respective pixel data based on the detected noise level; and
   a frame modification controller that modifies at least some of the respective pixels in the at least one replicated frame resulting in at least one modified replicated frame based on the selected modification level.

2. The camera control unit of claim 1, further comprising a video encoder that outputs a second video signal based on the at least one modified replicated frame.

3. The camera control unit of claim 2, wherein the second video signal includes a higher frame rate than the first video signal.

4. The camera control unit of claim 2, wherein the second video signal comprises a combination of frames including the respective frame of the first video signal and the at least one modified replicated frame.

5. The camera control unit of claim 2, wherein the second video signal comprises a combination of frames including at least one replicated frame and at least one modified replicated frame.

6. The camera control unit of claim 2, wherein the second video signal comprises a combination of frames including the respective frame of the first video signal, the at least one replicated frame, and the at least one modified replicated frame.

7. The camera control unit of claim 2, wherein the second video signal comprises a plurality of modified replicated frames.

8. The camera control unit of claim 1, wherein the frame modification controller modifies the pixel data for each pixel in the respective replicated frame.

9. The camera control unit of claim 1 wherein the frame modification controller modifies the pixel data for every nth pixel in a respective line of pixels for the replicated frame where n is an integer greater than 1.

10. The camera control unit of claim 1 wherein the frame modification controller randomly selects a subset of pixels in the at least one of the replicated frames and wherein the random modification of the respective pixel data is performed for the randomly selected subset of pixels.

11. A method for processing a first video signal from an image sensor, the first video signal including a plurality of frames, comprising:
   replicating pixels of a respective frame of the first video signal to produce at least one replicated frame;
   detecting a noise level in the first digital video signal;
   selecting a modification level for the random modification of the respective pixel data based on the detected noise level; and
   modifying at least some of the respective pixels in the at least one replicated frame resulting in at least one modified replicated frame based on the selected modification level.

12. The method of claim 11, further comprising outputting a second video signal based on the at least one modified replicated frame.

13. The method of claim 12, wherein the step of outgoing a second video signal includes the second video signal having a higher frame rate than the first video signal.

14. The method of claim 12, wherein the second video signal comprises a combination of frames including the respective frame of the first video signal and the at least one modified replicated frame.

15. The method of claim 12, wherein the second video signal comprises a combination of frames including at least one replicated frame and at least one modified replicated frame.

16. The method of claim 12, wherein the second video signal comprises a combination of frames including the respective frame of the first video signal, the at least one replicated frame, and the at least one modified replicated frame.

17. The method of claim 12, wherein the second video signal comprises a plurality of modified replicated frames.

18. The method of claim 11, further comprising modifying the pixel data for each pixel in the respective replicated frame.

19. The method of claim 11, further comprising modifying the pixel data for every nth pixel in a respective line of pixels for the replicated frame where n is an integer greater than 1.

20. The method of claim 11, further comprising randomly selecting a subset of pixels in the at least one of the replicated frames and wherein the random modification of the respective pixel data is performed for the randomly selected subset of pixels.

* * * * *